United States Patent [19]
Husse et al.

[11] Patent Number: 6,105,745
[45] Date of Patent: Aug. 22, 2000

[54] DISENGAGEMENT MECHANISM FOR A FRICTION CLUTCH

[76] Inventors: Ulrich Husse, Sperlingstrasse 38, 97422 Schweinfurt; Kurt Lindner, Hainleinstrasse 108, 97464 Niederwerrn; Karl Müller, Steinleite 17, 97490 Kronungen; Reiner Voss, Hainerweg, 97490 Maibach; Thomas Walter, Schulweg 17, 97509 Herlheim, all of Germany

[21] Appl. No.: 09/106,634

[22] Filed: Jun. 29, 1998

[30] Foreign Application Priority Data

Jun. 30, 1997 [DE] Germany .................. 197 27 874

[51] Int. Cl.$^7$ ................................ F16D 23/14
[52] U.S. Cl. .................... 192/995; 192/98; 192/109 R
[58] Field of Search .................... 192/995, 109 R, 192/91 R, 98, 89.24

[56] References Cited

U.S. PATENT DOCUMENTS

| | | | |
|---|---|---|---|
| 4,186,828 | 2/1980 | Renaud | 192/98 |
| 4,648,500 | 3/1987 | Parzefall | 192/99 S |
| 4,773,516 | 9/1988 | Parzefall | 192/30 V |
| 4,821,858 | 4/1989 | Kabayama | 192/91 R |
| 4,830,162 | 5/1989 | Kuno | 192/98 |
| 4,832,166 | 5/1989 | Parzefall | 192/98 |
| 5,009,300 | 4/1991 | Romig | 192/98 |
| 5,012,911 | 5/1991 | Kabayama | 192/89.24 |
| 5,785,164 | 7/1998 | Hanique et al. | 192/99 S |

FOREIGN PATENT DOCUMENTS

| | | | |
|---|---|---|---|
| 2 596 477 | 3/1987 | France | F16D 13/38 |
| 38 10 369 | 10/1989 | Germany | F16D 23/14 |
| 297 00 508 | 5/1997 | Germany | F16D 23/14 |
| 2 157 791 | 4/1985 | United Kingdom | F16D 23/14 |
| 2 196 086 | 4/1988 | United Kingdom | F16D 23/14 |
| 2 219 059 | 11/1989 | United Kingdom | F16D 23/14 |
| 2 246 181 | 1/1992 | United Kingdom | F16D 23/14 |
| 2 311 352 | 9/1997 | United Kingdom | F16D 23/14 |

*Primary Examiner*—Charles A. Marmor
*Assistant Examiner*—Saul Rodriguez

[57] ABSTRACT

A disengagement mechanism for a friction clutch which is to be arranged between an internal combustion engine and a transmission flanged to the internal combustion engine by a casing includes a guide pipe fastenable in the casing. A release bearing element is guided radially at the outer circumference of the guide pipe so as to be axially movable thereon. The disengagement mechanism also includes a clutch lever which is to be articulated at the casing for transmitting clutch actuating forces to the release bearing element. At least the guide pipe, the release bearing, and the clutch lever are held together to form a constructional unit prior to their arrangement between the internal combustion engine and the transmission by movement limiting device, thereby facilitating the assembly of the disengagement mechanism. In the operation-ready, installed state, the movement limiting devices influences the movability of the disengagement mechanism.

14 Claims, 7 Drawing Sheets

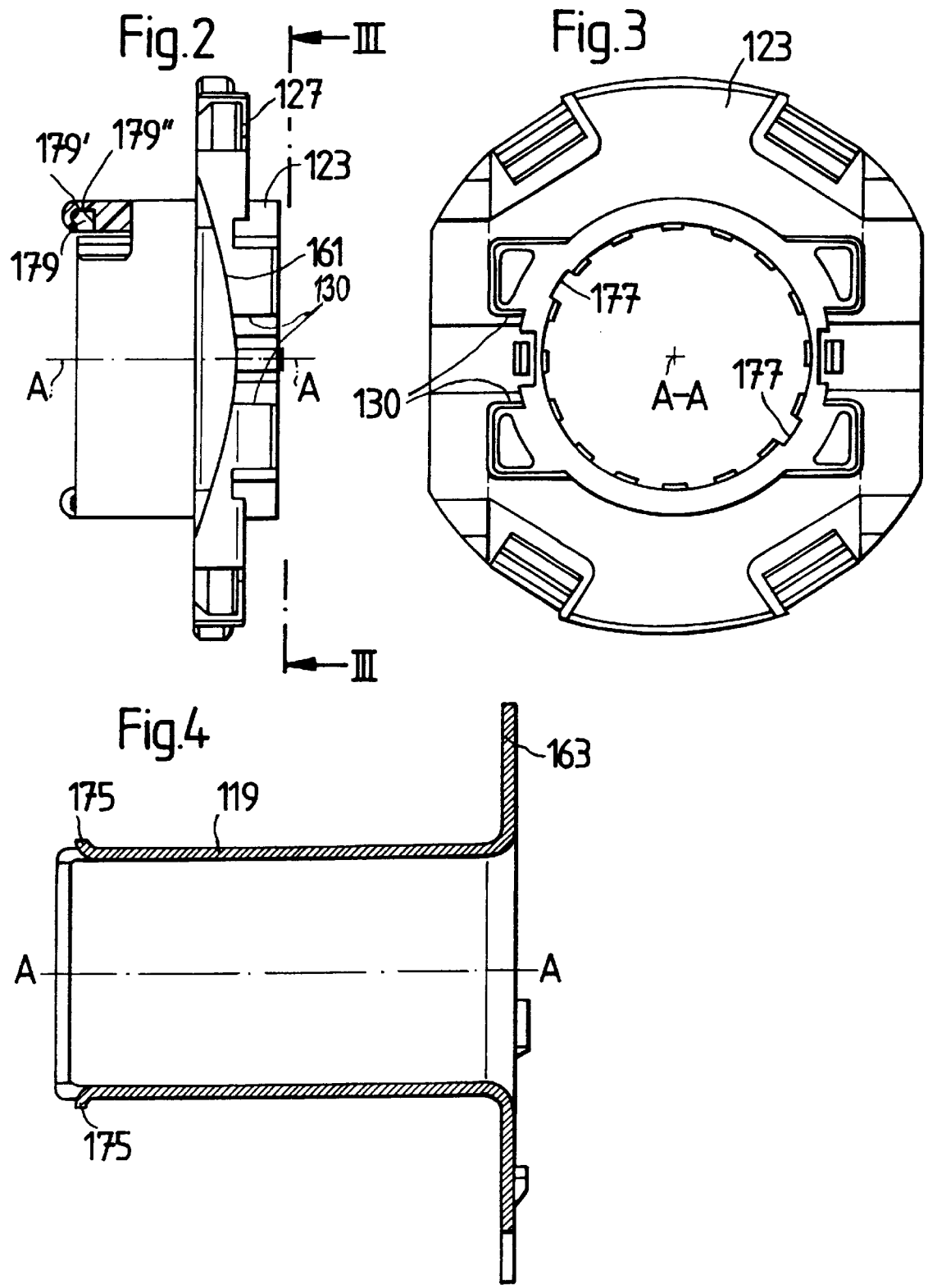

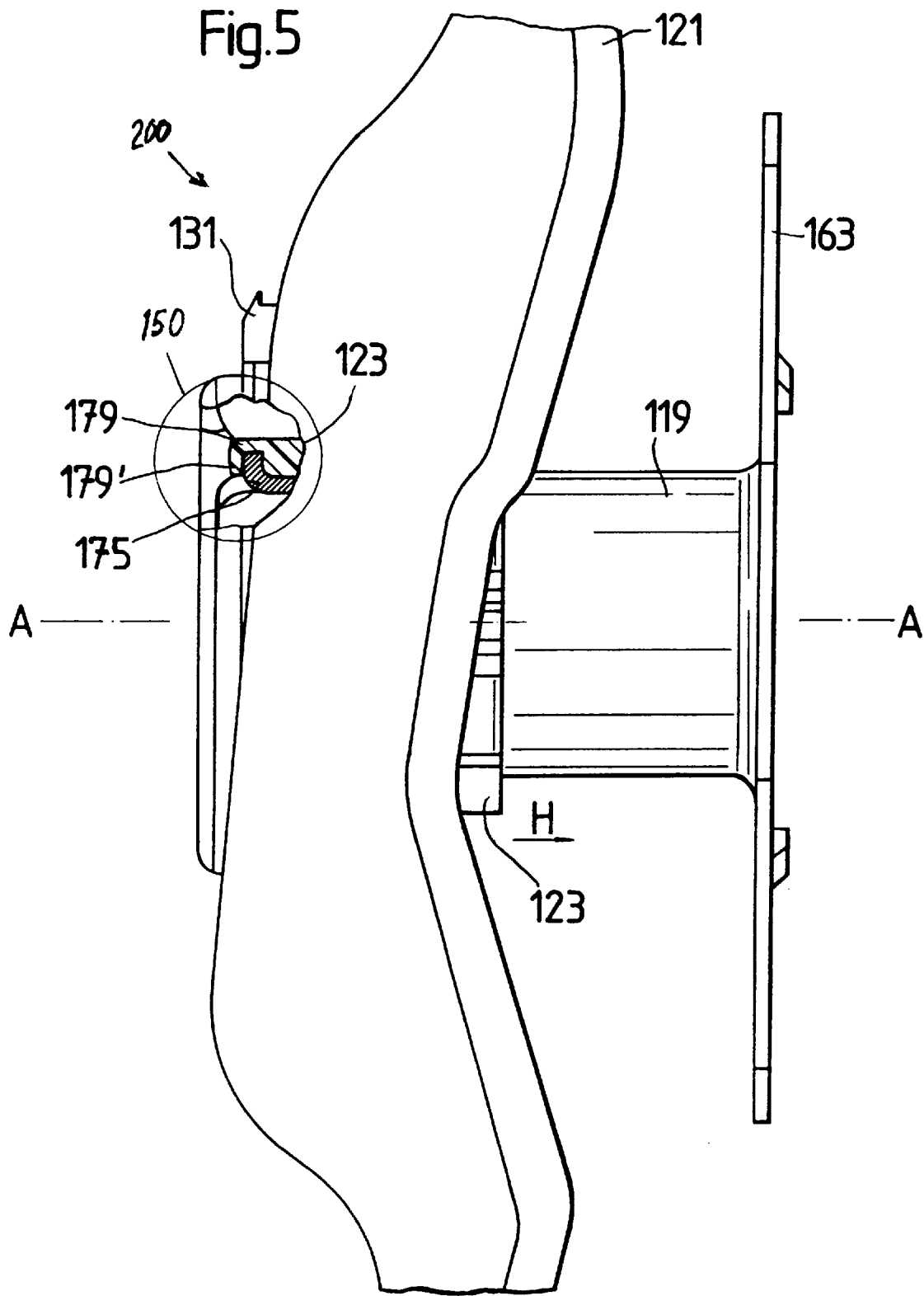

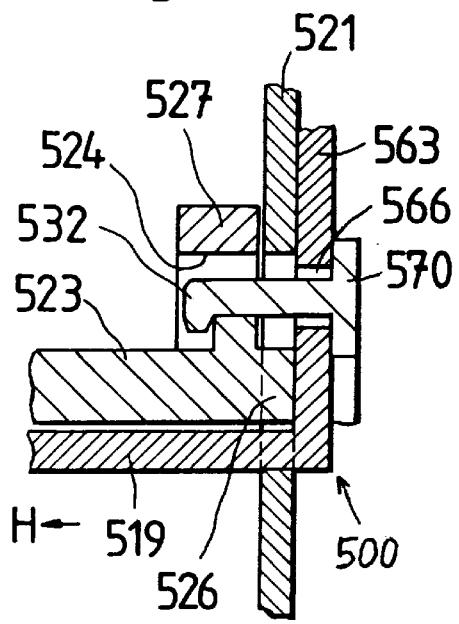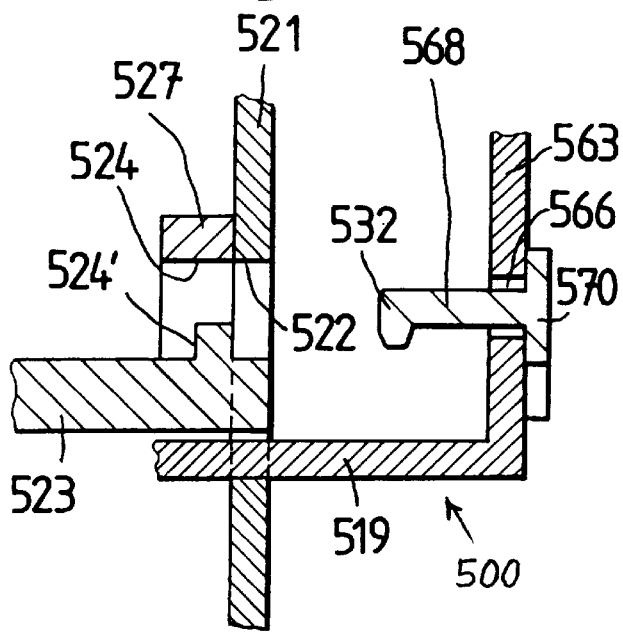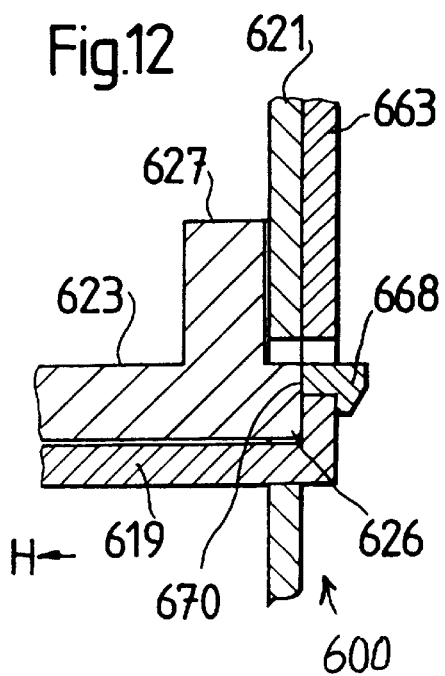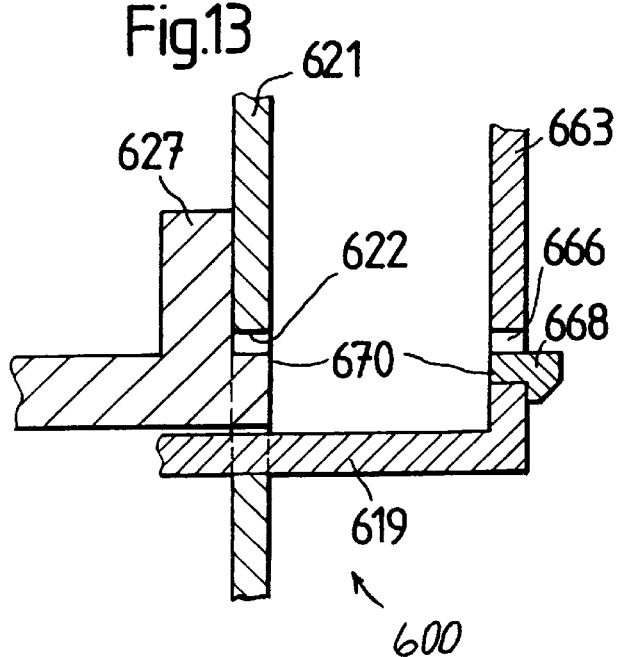

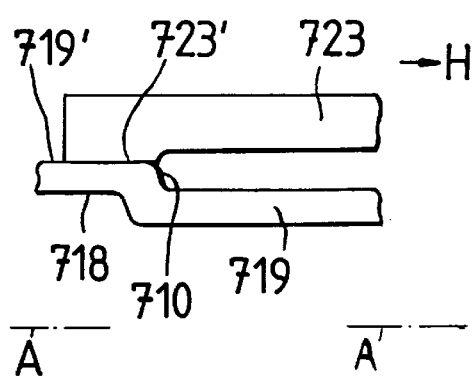
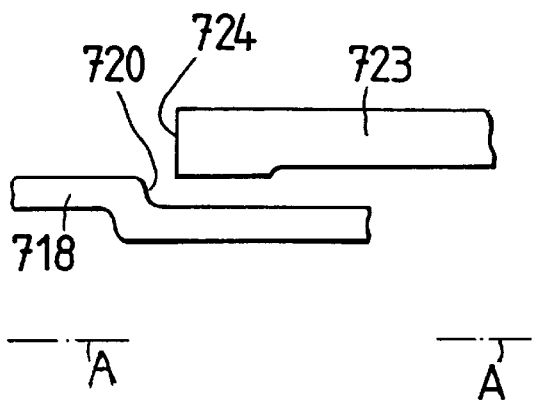
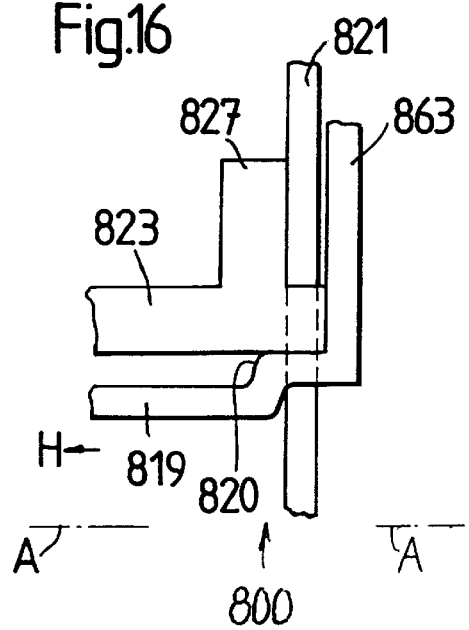
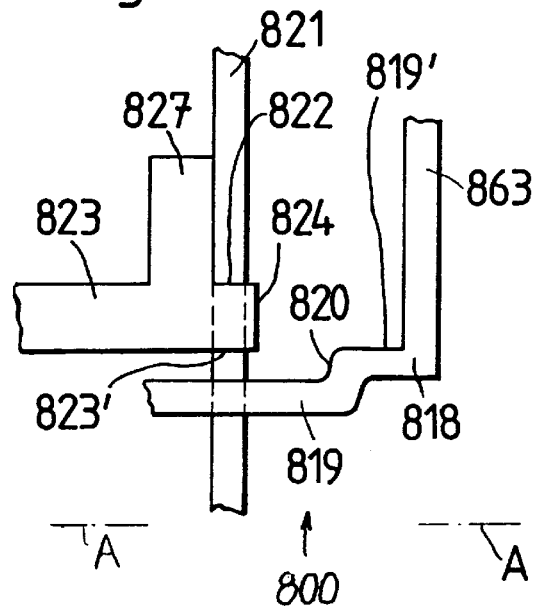

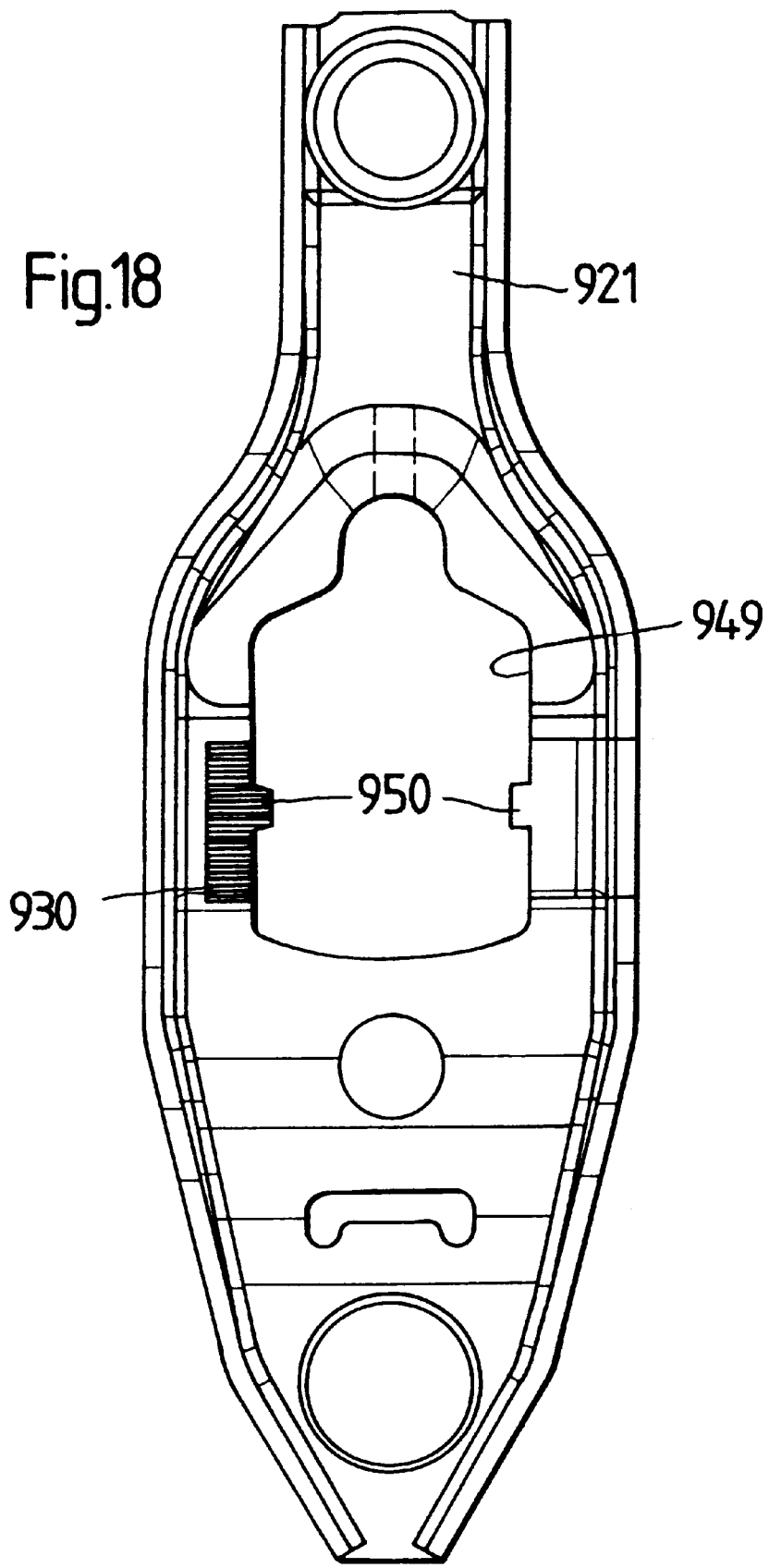

DISENGAGEMENT MECHANISM FOR A FRICTION CLUTCH

BACKGROUND OF THE INVENTION

1. Field of the Invention

The present invention relates to a disengagement mechanism for a friction clutch in a motor vehicle, wherein the friction clutch is arranged between an internal combustion engine and a transmission connected to the internal combustion engine by a casing and the friction clutch is rotatable about an axis.

2. Description of the Related Art

German reference DE-OS 23 22 247 discloses a self-centering release bearing which is held in frictional contact at a clutch lever so as to be displaceable radially by a plurality of spring clamps. The spring clamps also fix a guide sleeve which slides on a guide pipe between the release bearing and the clutch lever.

British reference GB-2 046 359 A discloses a release bearing whose guide sleeve can be snapped onto a release lever when installed in the vehicle by locking pins which are formed integral with the guide sleeve.

French reference FR-2 577 291 discloses a self-centering release bearing arrangement in which the release bearing, the guide pipe and a pressing disk are preassembled by a clamping ring. The pressing disk is contacted during operation by a clutch fork that is separately mounted.

U.S. Pat. No. 4,648,500 discloses a mechanism of the type mentioned above in which a release bearing arrangement, a clutch lever and a guide sleeve are prepared separately from one another and are first joined upon installation in the vehicle.

In previous solutions, the individual components or component groups of the clutch disengaging mechanism were assembled only during the course of connecting the transmission to the engine. This made warehousing of the individual parts and assembly more difficult. In the event of a faulty positioning of the individual parts relative to one another, the transmission had to be separated from the engine again to correct the defective installation.

To compensate for axial play in the individual component parts of the disengaging mechanism in the operation-ready state, it is conventional to provide a preloading spring which pretensions the clutch lever relative to the friction clutch. The preloading spring is commonly integrated in the hydraulic slave cylinder of the disengaging mechanism which is to be mounted subsequently. It has also been attempted to install the preloading spring between the clutch lever and the casing. However, this requires separate means for securing or holding the assembly in place during installation. The means for securing would have to be introduced from the outside through an opening in the casing. After completion of the assembly of the preloading spring and the clutch lever, the opening must be resealed by, for example, a rubber cap.

SUMMARY OF THE INVENTION

It is the object of the invention to provide an improved disengagement mechanism for a friction clutch so that it is easy to assemble and, in particular, dispenses with additional means for securing the assembly during installation.

According to the invention, a friction clutch is arranged in a motor vehicle between an internal combustion engine and a transmission flanged to the internal combustion engine by a casing. The friction clutch is rotatable about an axis and includes a disengaging mechanism having a release bearing element and a guide pipe which is fastenable in the casing coaxially to the axis of rotation so as to axially penetrate the release bearing element. The release bearing element is guided on the guide pipe so as to be axially movable. The disengaging mechanism further includes a clutch lever operative for transmitting clutch actuating forces to the release bearing element and articulated connection elements for swivelably fastening the clutch lever to the casing. Furthermore, at least the release bearing element, the guide pipe and the clutch lever are nondetachably connected together to form a constructional unit prior to installation in the motor vehicle.

To meet the object of the invention, it is proposed that at least two components from a group consisting of the guide pipe, clutch lever, and release bearing element are detachably locked with one another by a movement limiting mechanism extending to an axial stroke region under the influence of an axial overcoming force. The axial stroke region is the region in which the release bearing moves during actuation of the clutch in both directions of the axis of rotation and is situated between the two components.

The axial stroke region to be utilized during actuation of the clutch includes the stroke of the axially movable components of the release unit on the guide pipe, and the possible gradual wandering of the position of these components in the engaged state during wear of the clutch lining. The stroke occurs during every engaging and disengaging process. In case the overcoming force to be applied for releasing the locking is substantially less than the axial forces occurring during clutch operation at the respective component (for example, due to the main clutch spring, slave cylinder), the axial stroke region to be utilized during clutch actuation can extend up to the locking position of the components.

The movement limiting mechanism may be arranged between the clutch lever and guide pipe, between the guide pipe and release bearing element, or between the release bearing element and clutch lever, wherein the remaining component is received in a nondetachable manner between the components which are locked together by the movement limiting mechanism.

The retaining or holding force of the movement limiting mechanism is preferably dimensioned such that the overcoming force applied after the fastening of the casing to the internal combustion engine by a main spring holding the friction clutch in engagement or by a clutch actuating element separates the movement limiting mechanism.

The movement limiting mechanism may be arranged such that the locking is again accomplished when disassembling the casing from the internal combustion engine under the pressure of the main spring holding the friction clutch in engagement. This prevents the disengagement mechanism from coming apart unintentionally during disassembly of the casing from the internal combustion engine.

The components of the disengagement mechanism as a separate constructional unit, or at least in the state prior to assembly at the casing, should snugly contact one another to prevent rattling to the greatest extent possible and, in particular, should be positioned beforehand relative to one another in a predetermined manner. For this purpose, the disengagement mechanism may be configured in such a way that, when the constructional unit is preassembled at the casing, the movement limiting means of the at least two components including the guide pipe, release bearing element and clutch lever associated with one another are held together essentially axially without play by a preloading spring.

In particular, the disengagement mechanism should not require its own integrated preloading spring, such as the preloading spring 73 mentioned in the prior application. Therefore, the preloading spring that is used may be associated with a clutch actuating element which is preassembled with respect to the casing and which acts on the clutch lever, especially a fluid-actuated slave cylinder. A preloading spring of this kind is usually present.

The movement limiting mechanism is preferably arranged at the side of the clutch lever facing the internal combustion engine because there is generally more space available at that location. However, the movement limiting mechanism may also be arranged at the side of the clutch lever facing the transmission. It can be configured such that it does not require any additional space in the axial direction.

The movement limiting mechanism may be connected by a positive engagement, frictional engagement or nonpositive engagement, or by a combination thereof, or can have a catch/snap-in connection. The movement limiting mechanism may be capable of being connected again after disassembly or may be disassembled only once. In the latter case, predetermined breaking lines may be provided.

Further, additional movement limiting mechanism may be provided between the clutch lever and release bearing element for limiting a movement of the clutch lever in its longitudinal direction relative to the release bearing element to a slight play, but also permitting a tilting of the clutch lever relative to the release bearing element about an axis normal to the axis of rotation and orthogonal to the longitudinal direction of the clutch lever.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements:

FIG. 2 is a partial sectional view of a bearing support of a disengagement mechanism according to an embodiment of the invention;

FIG. 3 is a sectional view of the bearing support of FIG. 2 viewed along line III—III.

FIG. 4 is a sectional view, of a guide pipe for the bearing support in FIG. 2;

FIG. 5 is a partial sectional view in the radial direction of the disengagement mechanism including the bearing support of FIG. 2 and the guide pipe of FIG. 4, and including a clutch lever in a preassembled position;

FIG. 10 is a partial sectional view of another embodiment of a disengagement mechanisms with a catch/snap-in connection on the transmission side which can be disconnected and reassembled, shown in the locked state;

FIG. 11 shows the disengagement mechanism of FIG. 10 in the separated state;

FIG. 12 is a partial sectional view of another embodiment of a disengagement mechanism with a snap-in catch connection on the transmission side with predetermined breaking location, shown in the locked state;

FIG. 13 shows the disengagement mechanism of FIG. 12 in the separated state;

FIG. 14 is a partial sectional view of another embodiment of a frictional-engagement type locking between a guide pipe and bearing support of a disengagement mechanism;

FIG. 15 shows the disengagement mechanism of FIG. 14 in the separated state;

FIG. 16 is a partial sectional view of another embodiment of a nonpositive type locking between a guide pipe and a bearing support of a disengagement mechanism on the transmission side with a clutch lever accommodated between the guide pipe and the bearing support;

FIG. 17 shows the disengagement mechanism of FIG. 16 in the separated state; and FIG. 18 shows an embodiment of a clutch lever portion of a disengagement mechanism viewed in a direction of the transmission.

DETAILED DESCRIPTION OF THE PRESENTLY PREFERRED EMBODIMENTS

This is an additional application based on the subject matter in U.S. patent application Ser. No. 08/821,772, which is incorporated herein by reference in its entirety.

Figure 1:
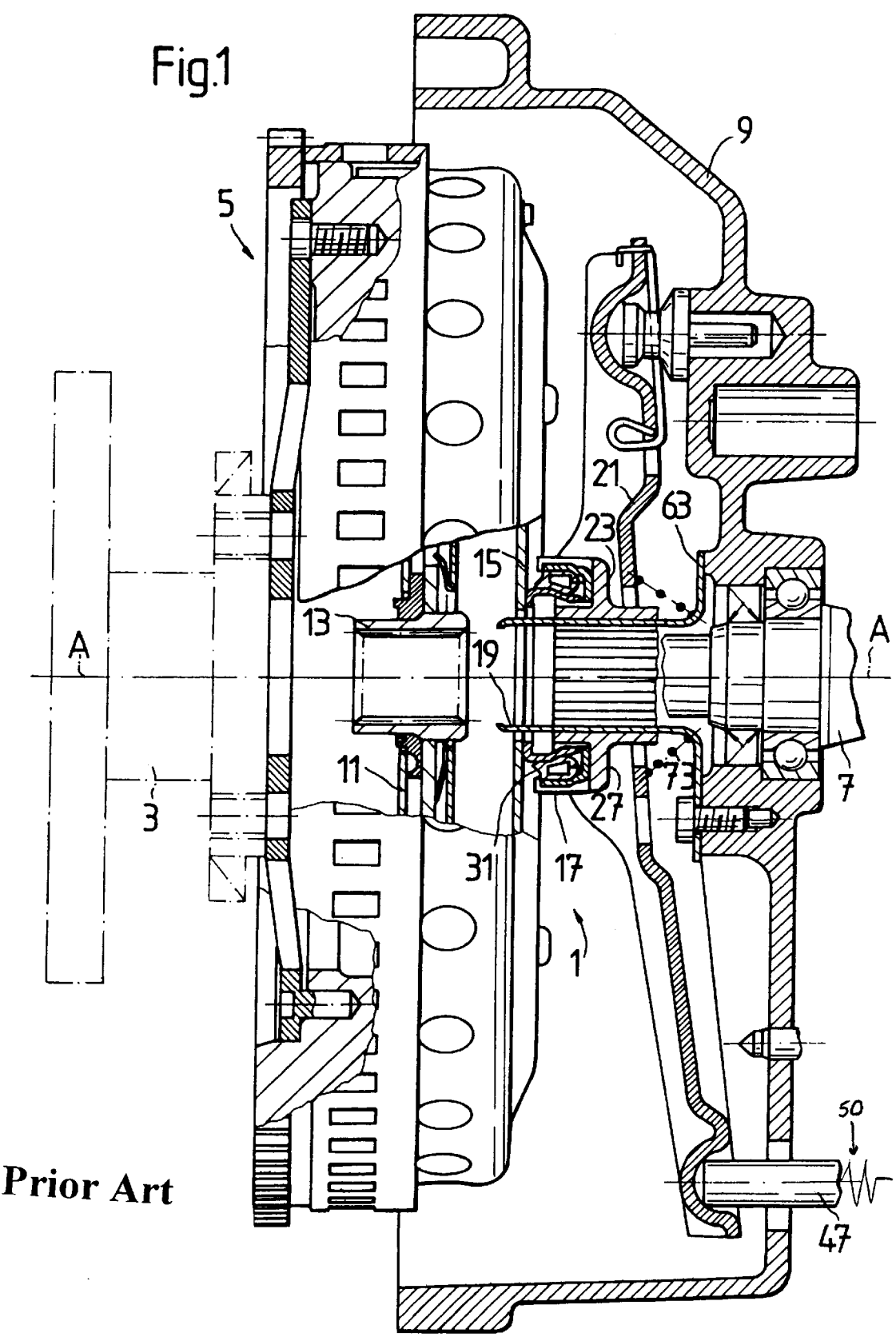
FIG. 1 shows an axial longitudinal section of a disengagement mechanism at a friction clutch in a motor vehicle according to a prior U.S. patent application Ser. No. 08/821,772.

Referring initially to FIG. 1, a partial axial longitudinal view through the embodiment of a disengagement mechanism 1 for a friction clutch 5 disclosed in U.S. patent application Ser. No. 08/821,772 is shown. The friction clutch 5 is arranged at the end of a crankshaft 3 of an internal combustion engine for transmitting torque from the crankshaft 3 to an input shaft 7 of a transmission arranged following the internal combustion engine. The crankshaft 3, clutch 5 and input shaft 7 are arranged in this order one behind the other coaxially along a common axis of rotation A—A. The transmission is flanged to the internal combustion engine by a casing 9 formed on at the transmission housing. The disengagement mechanism 1 is arranged axially between the clutch 5 and the casing 9.

The clutch 5 includes a clutch disk 11 which has, as is conventional, friction facings and a hollow hub 13. The hollow hub 13 is attached, via an axial longitudinal toothing, to the end of the transmission input shaft 7 so that it is fixed with respect to rotation but axially displaceable relative to it. The clutch disk 11 is clamped axially between a pressure plate and counterpressure plate of the clutch 5 on the crankshaft side by a diaphragm spring 15. The clutch 5 is disengagable by pressing axially on the diaphragm spring 15 toward the crankshaft 3 with the disengagement mechanism 1. The diaphragm spring 15 is shown by way of example. It will be understood that the disengagement mechanism 1 may also be applied in other kinds of clutches such as those using springs other than diaphragm springs.

The disengagement mechanism 1 comprises a release bearing element 17 for contacting end faces of spring tongues of the diaphragm spring 15 remote from the crankshaft 3. The disengagement mechanism 1 also comprises a guide pipe 19 which is fastened to the casing 9 coaxially to the axis of rotation A—A. The guide pipe 19 encloses the transmission input shaft 7 without contacting it. The release bearing element 17 is guided on the outer circumference of the guide pipe 19 so as to be axially slidable. The disengagement mechanism 1 also comprises a clutch lever 21 which is to be articulately connected at the casing 9 a distance from axis A—A for introducing clutch actuation forces to the release bearing element 17. The release bearing element 17 comprises a bearing support 23 and a release bearing 31 which is supported axially on the bearing support 23 by a flange 27. The prior U.S. patent application Ser. No. 08/821,772 describes in more detail the other elements of FIG. 1.

In the remaining Figures, elements corresponding to the prior U.S. patent application Ser. No. 08/821,772 have reference numbers increased by multiples of 100. For instance, bearing support 123 in FIG. 2 and 223 in FIG. 6 correspond to bearing support 23 in the prior application.

Referring now to FIGS. 2 through 5, a bearing support 123 and a guide pipe 119 according to the invention are shown. A movement limiting mechanism 150 is connected between the bearing support 123 and the guide pipe 119, remote of the transmission, (See FIG. 5). The movement limiting mechanism 150 includes two protuberances 175 which project radially diametrically opposed from one another at the clutch-side end of the guide pipe 119 and slide through longitudinal grooves 177 of the bearing support 123 when the bearing support 123 is axially mounted thereon. Similarly to FIG. 1, a release bearing 131 may be preassembled at the bearing support 123. The movement limiting mechanism 150 also includes protuberance receptacles 179 at the clutch side of the bearing support 123 which are defined axially on both sides by surfaces 179', 179" extending substantially normal to the axis of rotation A—A. After the bearing support 123 is slid onto the guide pipe 119, the bearing support 123 is rotated approximately a quarter turn about the axis of rotation A—A relative to the guide pipe 119 so that the protuberances 175 enter the protuberance receptacles 179 of the bearing support 123 and are held substantially axially without play. A clutch lever 121 which is premounted on the guide pipe 119 from the clutch-side end is nondetachably received between a transmission-side fastening flange 163 of the guide pipe 119 and a flange 127 of the bearing support 123.

The clutch lever 121, the release bearing element formed of the bearing support 123 and release bearing 131, and the guide pipe 119 accordingly form a nondetachably connected constructional unit 200 (FIG. 5). There is no preloading spring—such as spring 73 in FIG. 1—between the fastening flange 163 and the clutch lever 121. In the preassembled state of the constructional unit 200 at casing 9, a pressure spring 50 located in a clutch slave cylinder 47 (see FIG. 1) may be preassembled at the casing 9 for pressing the clutch lever 121 without play against the flange 163 of the bearing support 123. When the casing 9, including the preassembled disengagement constructional unit 200, is flanged onto the internal combustion engine, the plate spring 15 of the friction clutch 5 which is preassembled at the engine presses in the direction of the axis of rotation A—A on the bearing support 123 via the release bearing 131. The force exerted by the plate spring 15 on the bearing support 123 folds away or breaks the limiting means 179' of the protuberance receptacle 179, so that the bearing support 123 moves into the axial stroke region H for utilization during clutch actuation.

When the clutch facing is completely worn, the bearing support 123 may contact the fastening flange 163 in the engaged state.

Figure 6:
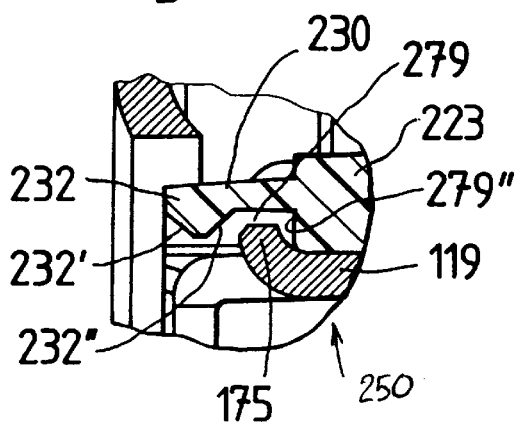
FIG. 6 shows another embodiment of the detail of the disengagement mechanism in the circle shown in FIG. 5.

FIG. 6 shows another embodiment of the movement limiting mechanism 150 of FIG. 5. In this case, a movement limiting mechanism 250 is constructed as a snap-in catch connection between the protuberances 175 of the guide pipe 119 and a bearing support 223. A radially springing catch tongue 230 projects from the bearing support 223 toward the clutch 5. A catch projection 232 which is beveled on either axial side at surfaces 232' and 232" projects inward radially from the free end of the catch tongue 230. The catch projection 232 and an end face 279" of the bearing support 223 axially limit on both sides a protuberance receptacle 279 for receiving the protuberance 175 of the guide pipe 119 and accordingly locking the guide pipe 119 at the bearing support 223 when the constructional unit is preassembled at the casing 9. The protuberance receptacle 279 also locks the bearing support 223 against the action of the preloading spring in the slave cylinder 47. Due to the pressure of the clutch plate spring 15 when the casing and the disengagement constructional unit 200 are flanged onto the internal construction engine, the catch tongue 230 slides along the bevel 232' slides over the protuberance 175 and enables a free axial movement of the bearing support 223 on the guide pipe 119.

When the casing 9, together with the disengagement constructional unit 200, must be removed—to service the clutch, for example—the radially deflecting catch tongue 230 slides along and the bevel 232' slides over the protuberance 175 under the influence of the preloading spring, so that the bearing support 223 is again nondetachably locked and caught at the guide pipe 119.

Figure 7:
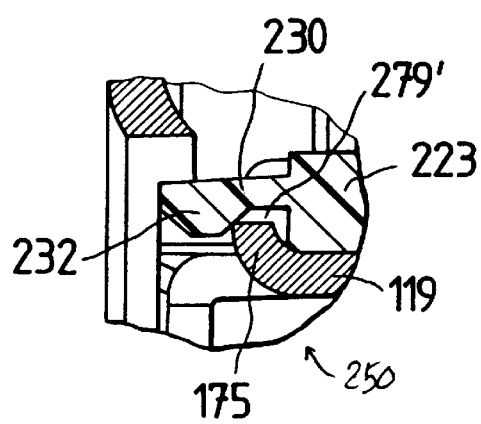

FIG. 6 shows a construction with axial play between the protuberance 175 and the protuberance receptacle 279, whereas FIG. 7 shows another embodiment of the latter without such axial play, wherein the protuberance receptacle 279' is axially narrowed.

The catch tongue 230 may be produced from plastic to form one integral piece with the bearing support 223.

Figure 8:
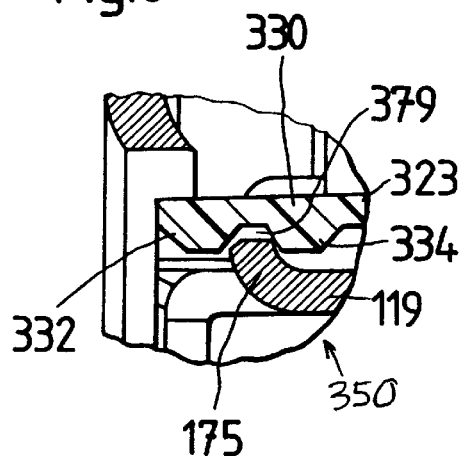
FIGS. 7–9 show other embodiments of the circled portion of the disengagement mechanism shown in FIG. 5.

FIG. 8 shows another embodiment of a movement limiting mechanism 350 with the radially elastic catch tongue. In this case, a catch tongue 330 has two catch projections 332, 334 which face radially inward at an axial distance from each other. Each of the two catch projections 332, 334 is beveled at both axial side surfaces. The protuberance receptacle 379 is located axially between the two catch projections 332, 334. In this embodiment, the bearing support 323 may be locked with the guide pipe 119 axially, wherein, in the end stroke of this axial movement, the protuberance 175 snaps into the protuberance receptacle 379 by a radial deflecting movement of the transmission-side catch projection 334. A rotating movement for locking such as that in the constructions shown in FIGS. 2 to 7 is not required in this case. Similarly to the construction shown in FIG. 6, the clutch-side catch projection 332 also permits repeated locking and unlocking in case of repairs to the clutch.

Figure 9:
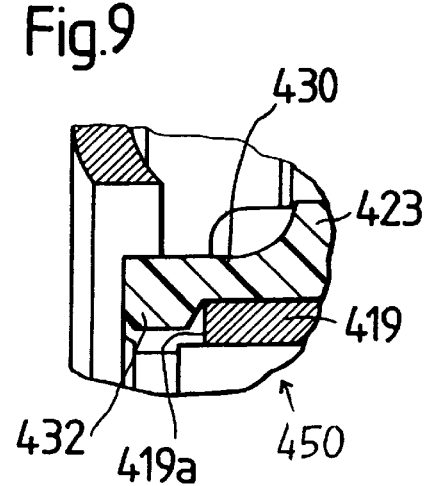

FIG. 9 shows yet another embodiment of a movement limiting mechanism 450 which does not require the protuberance 179 of the guide pipe 119 and the associated longitudinal groove in the bearing support 123. As in the embodiments described above, a catch tongue 430 projects from the bearing support 423 on the clutch side and carries a catch projection 432 which is beveled on both axial sides and projects inward radially. The catch projection 432 engages behind an end face 419a of a guide pipe 419 on the clutch side. This embodiment operates in a manner similar to that shown in FIG. 8; wherein no rotational movement is required for locking the guide pipe 419 and bearing support 423.

FIGS. 10 and 11 show another embodiment of a construction unit 500 with a reversible locking between a guide pipe 519 and a bearing support 523. Proceeding from the side closest to the transmission, catch hooks 568 are inserted through openings 566 in the guide pipe flange 563 which are distributed circumferentially. The catch hooks 568 are connected with one another on the transmission side by a ring 570 forming one integral piece. The catch hooks 568 penetrate axial holes 522 of the clutch lever 521 which are aligned with openings 566 and penetrate axial holes 524 in the flange 527 of the bearing support 523 which are likewise aligned therewith. The axial holes 524 of the bearing support 523 contain catch faces 524' normal to the axis for the catch hooks 568. In the locked state of the constructional unit, the clutch lever 521 is held between the flange 527 of the bearing support 523 and the guide pipe flange 563 so as to be nondetachable and substantially free from play. To prevent play between the parts, a transmission-side continuation 526 of the bearing support 523 penetrates the hole 522 of the clutch lever 521 and contacts the guide pipe flange 568. This position may correspond to the completely worn position of the clutch. The locking is canceled the first time the clutch is actuated toward the axial stroke region H of the bearing support 523 to be utilized during clutch actuation, i.e., toward the left in 10 and 11. As in FIGS. 6 and 7, the construction unit 500 may also be locked again in case of repairs to the clutch.

FIGS. 12 and 13 show a construction unit 600 similar to construction FIGS. 10 and 11, wherein, however, catch hooks 668 project in one piece from a supporting continuation 262 of a bearing support 623 toward the transmission side and penetrate holes 622 of the clutch lever 621 and openings 666 of the guide pipe flange 663 so as to extend through the latter on the transmission side. As in FIGS. 10 and 11, the catch hooks may be locked in a reversible manner or, as is shown, may have a predetermined breaking location 670 along which the hook 668 breaks off when the clutch is first actuated.

The predetermined breaking location 670 extends in the plane of separation between the clutch lever 621 and the guide pipe flange 663. This prevents the broken off residual hook 668 from blocking engagement when the clutch is close to the fully worn state in which the break surfaces of the predetermined breaking location 670 approach one another again when the clutch is engaged.

FIGS. 14 and 15 show schematically a clutch-side nonpositive locking or frictional locking between a guide pipe 719 and bearing support 723. An inner circumferential surface 723' of the bearing support cooperates in a nonpositive engagement with an external circumferential surface 719' of the guide pipe 719. Under the influence of the clutch plate spring 15, the bearing support 723 is displaced toward the right as viewed in FIGS. 14 and 15. In so doing, the clutch-side end face 724 of the bearing support 723 slides over a step 720 of the guide pipe 719, which step 720 springs inward radially and limits the friction surface 719' of the guide pipe toward the transmission side, so that the bearing support 723 is released toward the right with reference to FIG. 14 toward the axial stroke region H to be utilized during engagement of the clutch.

FIGS. 16 and 17 show another embodiment of a construction unit 800 having nonpositive/frictional locking between a guide pipe 819 and a bearing support 823 near a guide pipe flange 863. An inner circumferential surface 823' close to the transmission-side end of the bearing support 823 enters into a frictional engagement with an outer circumferential surface 819' of the guide pipe 819. The outer circumferential surface 819' is limited toward the clutch side by a step 820 which springs inward radially. The portion carrying the friction surface 823' of the bearing support 823 penetrates an opening 822 of a clutch lever 821. Accordingly, in the locked state, the clutch lever 821 is held tightly between a flange 827 of the bearing support 823 and the guide pipe flange 863. The first time the clutch is activated, the bearing support is moved away from the transmission by the clutch lever 821. When a transmission-side end face 824 of the bearing support moves over the step 820 of the guide pipe, the locking of the elements is canceled.

FIG. 18 shows another construction of a clutch lever 921 similar to the construction of FIG. 1 in which, however, protuberances 950 project from both longitudinal edges of an elongated hole 949 for receiving the bearing support sleeve. The protuberances 950 project inward radially toward one another and enter recesses 130 of the bearing support 123 (see FIGS. 2 and 3), these recesses 130 being limited in the longitudinal direction of the clutch lever 921. The protuberances 950 limit a movement of the clutch lever 921 in its longitudinal direction relative to the bearing support 123, but allow a slight play in this longitudinal direction and enable a tilting of the clutch lever relative to the bearing support 123 about an axis normal to the axis of rotation A—A and orthogonal to the longitudinal direction of the clutch lever. The surface 930 which is shaded in FIG. 18 shows a pressing surface for contact at the axially projecting bulges 161 of the bearing support 123 (see FIG. 2).

The invention is not limited by the embodiments described above which are presented as examples only but can be modified in various ways within the scope of protection defined by the appended patent claims.

What is claimed is:

1. A disengagement mechanism for a friction clutch which is arranged in a motor vehicle between an internal combustion engine and a transmission flanged to the internal combustion engine by a casing and is rotatable about an axis of rotation, the disengagement mechanism comprising:

a release bearing element;

a guide pipe fastenable in the casing coaxially to the axis of rotation so as to axially penetrate said release bearing element, said release bearing element being axially movably guided on said guide pipe within an axial stroke region, said axial stroke region comprising an operative movement area of said release bearing element;

a clutch lever operative for transmitting clutch actuating forces to said release bearing element, wherein at least said release bearing element said guide pipe, and said clutch lever are connected together to form a construction unit prior to installation in the motor vehicle;

joint means operatively arranged such that said clutch lever is swivelably connectable to the casing via said joint means;

said construction unit comprising a first component and a second component selected from the group consisting of said guide pipe, said clutch lever, and said release bearing element; and a movement limiting means detachably locking said first component and said second component under the influence of an axial overcoming force, so that said release bearing element is within said axial stroke region when said first and second components are detachably locked by said movement limiting means, wherein said movement limiting means comprises a holding force sized such that said first and second components are unlockable by an overcoming force applied by one of a main spring holding the friction clutch in engagement and a clutch actuating element after the fastening of the casing to the internal combustion engine.

2. The disengagement mechanism of claim 1, wherein said movement limiting means are arranged such that said first and second component are relockable during disassembly of the casing from the internal combustion engine under the pressure of the main spring holding the friction clutch in engagement.

3. A disengagement mechanism for a friction clutch which is arranged in a motor vehicle between an internal combustion engine and a transmission flanged to the internal combustion engine by a casing and is rotatable about an axis of rotation, the disengagement mechanism comprising:

a release bearing element;

a guide pipe fastenable in the casing coaxially to the axis of rotation so as to axially penetrate said release bearing element, said release bearing element being axially movably guided on said guide pipe within an axial stroke region, said axial stroke region comprising an operative movement area of said release bearing element;

a clutch lever operative for transmitting clutch actuating forces to said release bearing element, wherein at least said release bearing element said guide pipe, and said clutch lever are connected together to form a construction unit prior to installation in the motor vehicle;

joint means operatively arranged such that said clutch lever is swivelably connectable to the casing via said joint means;

said construction unit comprising a first component and a second component selected from the group consisting of said guide pipe, said clutch lever, and said release bearing element; and a movement limiting means detachably locking said first component and said second component under the influence of an axial overcoming force, so that said release bearing element is within said axial stroke region when said first and second components are detachably locked by said movement limiting means, wherein said movement limiting means are operative for detachably locking said first component and said second component when said first and second components are pushed together axially and subsequently rotated about said axis of rotation.

4. The disengagement mechanism of claim 3, wherein said first component comprises said guide pipe and said second component comprises said release bearing, said movement limiting means comprises at least one protuberance projecting radially from said guide pipe at an engine-side end and is displaceable through a longitudinal groove in the release bearing element, and when said protuberance is fully displaced through said longitudinal groove, a relative rotation of said guide pipe and release bearing element engages said protuberance with a protuberance receptacle of the release bearing element which locks said protuberance in both longitudinal directions of said axis of rotation.

5. The disengagement mechanism of claim 4, wherein said protuberance is held in the protuberance receptacle substantially axially without play.

6. The disengagement mechanism of claim 4, wherein said protuberance receptacle is connected with said release bearing element in a radially resilient manner and slides over the protuberance resiliently when said release bearing element is removed axially from said guide pipe.

7. A disengagement mechanism for a friction clutch which is arranged in a motor vehicle between an internal combustion engine and a transmission flanged to the internal combustion engine by a casing and is rotatable about an axis of rotation, the disengagement mechanism comprising:

a release bearing element;

a guide pipe fastenable in the casing coaxially to the axis of rotation so as to axially penetrate said release bearing element, said release bearing element being axially movably guided on said guide pipe within an axial stroke region, said axial stroke region comprising an operative movement area of said release bearing element;

a clutch lever operative for transmitting clutch actuating forces to said release bearing element, wherein at least said release bearing element said guide pipe, and said clutch lever are connected together to form a construction unit prior to installation in the motor vehicle;

joint means operatively arranged such that said clutch lever is swivelably connectable to the casing via said joint means;

said construction unit comprising a first component and a second component selected from the group consisting of said guide pipe, said clutch lever, and said release bearing element; and a movement limiting means detachably locking said first component and said second component under the influence of an axial overcoming force, so that said release bearing element is within said axial stroke region when said first and second components are detachably locked by said movement limiting means, wherein said movement limiting means comprises a snap-in catch connection which engages when said first and second components are axially put together.

8. The disengagement mechanism of claim 7, wherein said snap-in catch connection is reversibly detachable by taking apart axially said first and second components.

9. The disengagement mechanism of claim 7, wherein said snap-in connection comprises a radially elastic catch hook projecting from one of said first component and said second component and a catch hook receptacle on the other of said first component and said second component.

10. The disengagement mechanism of claim 7, wherein said snap-in catch connection holds said second component at said first component substantially axially without play.

11. The disengagement mechanism of claim 7, wherein said first component comprises said guide pipe and said second component comprises said release bearing element.

12. The disengagement mechanism of claim 11, wherein said snap-in connection comprises at least one radially springing catch hook projecting from a transmission side of one of said guide pipe and said release bearing element and parallel to said axis of rotation and engageable with a catch hook receptacle of the other of said guide pipe and release bearing element, wherein said clutch lever is nondetachably received between said release bearing element and said guide pipe and comprises a passage extending parallel to said axis of rotation and operatively positioned for permitting the free passage of the catch hook therethrough.

13. A disengagement mechanism for a friction clutch which is arranged in a motor vehicle between an internal combustion engine and a transmission flanged to the internal combustion engine by a casing and is rotatable about an axis of rotation, the disengagement mechanism comprising:

a release bearing element;

a guide pipe fastenable in the casing coaxially to the axis of rotation so as to axially penetrate said release bearing element, said release bearing element being axially movably guided on said guide pipe within an axial stroke region, said axial stroke region comprising an operative movement area of said release bearing element;

a clutch lever operative for transmitting clutch actuating forces to said release bearing element, wherein at least said release bearing element said guide pipe, and said clutch lever are connected together to form a construction unit prior to installation in the motor vehicle;

joint means operatively arranged such that said clutch lever is swivelably connectable to the casing via said joint means;

said construction unit comprising a first component and a second component selected from the group consisting of said guide pipe, said clutch lever, and said release bearing element; and a movement limiting means detachably locking said first component and said second component under the influence of an axial overcoming force, so that said release bearing element is within said axial stroke region when said first and second components are detachably locked by said movement limiting means, wherein said movement limiting means comprise fitting surfaces extending parallel to said axial direction and contacting one another in a nonpositive engagement, wherein the fitting surfaces disengage at their axial ends for separating said first and second components, and wherein one of said first component and said second component comprises a radially expanded annular shoulder having a circumferential surface forming a first fitting surface near one of an end remote from the transmission and on end near the transmission which ends in the direction of the axial stroke region, and the other of said first component and said second component companies an annular second fitting surface which slides in the direction of the axis of rotation of the annular shoulder when said first and second components are separated.

14. A disengagement mechanism for a friction clutch which is arranged in a motor vehicle between an internal combustion engine and a transmission flanged to the internal combustion engine by a casing and is rotatable about an axis of rotation, the disengagement mechanism comprising:

a release bearing element;

a guide pipe fastenable in the casing coaxially to the axis of rotation so as to axially penetrate said release bearing element, said release bearing element being axially movably guided on said guide pipe within an axial stroke region, said axial stroke region comprising an operative movement area of said release bearing element;

a clutch lever operative for transmitting clutch actuating forces to said release bearing element, wherein at least said release bearing element said guide pipe, and said clutch lever are connected together to form a construction unit prior to installation in the motor vehicle;

joint means operatively arranged such that said clutch lever is swivelably connectable to the casing via said joint means;

said construction unit comprising a first component and a second component selected from the group consisting of said guide pipe, said clutch lever, and said release bearing element;

a movement limiting means detachably locking said first component and said second component under the influence of an axial overcoming force, so that said release bearing element is within said axial stroke region when said first and second components are detachably locked by said movement limiting means; and an additional movement limiting means arrangable between said clutch lever and said release bearing element for limiting a movement of said clutch lever in a longitudinal direction relative to the release bearing element, but permitting a tilting of the clutch lever relative to the release bearing element about an axis normal to the axis of rotation, and wherein said additional movement limiting means comprises protuberances projectable radially inward from a through-opening of said clutch lever for the guide pipe into recesses of said release bearing element which are limited in the longitudinal direction of the clutch lever.

* * * * *